United States Patent
Shimizu et al.

(10) Patent No.: US 7,816,612 B2
(45) Date of Patent: Oct. 19, 2010

(54) ROTARY MEASURING DEVICE

(75) Inventors: Ken Shimizu, Shiga (JP); Fumitaka Tokuda, Shiga (JP)

(73) Assignee: Ishida Co., Ltd., Kyoto-shi (JP)

( * ) Notice: Subject to any disclaimer, the term of this patent is extended or adjusted under 35 U.S.C. 154(b) by 295 days.

(21) Appl. No.: 12/158,362

(22) PCT Filed: Dec. 20, 2006

(86) PCT No.: PCT/JP2006/325370

§ 371 (c)(1),
(2), (4) Date: Jun. 20, 2008

(87) PCT Pub. No.: WO2007/072853

PCT Pub. Date: Jun. 28, 2007

(65) Prior Publication Data

US 2009/0229891 A1    Sep. 17, 2009

(30) Foreign Application Priority Data

Dec. 21, 2005  (JP)  ............................. 2005-368008
Feb. 10, 2006  (JP)  ............................. 2006-033352

(51) Int. Cl.
*G01G 15/00*  (2006.01)
*G01G 13/24*  (2006.01)
*G01G 9/00*   (2006.01)

(52) U.S. Cl. .............................. 177/1; 141/83; 177/58; 177/83

(58) Field of Classification Search ............. 177/1, 177/54, 58, 83–88; 222/55, 56, 77; 141/83
See application file for complete search history.

(56) References Cited

U.S. PATENT DOCUMENTS

| 4,832,092 A |   | 5/1989  | Hirose et al. |
| 5,646,375 A | * | 7/1997  | Neuman .................. 177/54 |
| 5,700,982 A | * | 12/1997 | Neuman .................. 177/229 |
| 5,798,487 A | * | 8/1998  | Goichman et al. ............. 177/83 |

FOREIGN PATENT DOCUMENTS

| JP | 03-191833 A   | * | 8/1991  |
| JP | H07-98521 B2  |   | 10/1995 |
| JP | 2794472 B2    |   | 6/1998  |
| JP | 2004-333308 A |   | 11/2004 |
| JP | 2005-241347 A |   | 9/2005  |
| WO | WO 2007-072853 A1 | * | 6/2007 |

* cited by examiner

*Primary Examiner*—Randy W Gibson
(74) *Attorney, Agent, or Firm*—Global IP Counselors, LLP (57) ABSTRACT

A rotary measuring device includes a measuring unit, a centrifugal force error calculation block, and a weight value calculation block. The measuring unit includes a measuring plate and a load cell. The load cell has a fixed end and a free end on which the measuring plate is disposed. The centrifugal force error calculation block calculates, on the basis of a first measured value outputted from the load cell in a state where the measuring unit is rotating, an angular displacement θ with respect to a horizontal plane of the load cell in the vicinity of the free end. The weight value calculation block calculates a weight value of the object on the basis of the angular displacement value and a second measured value outputted from the load cell in a state where the measuring plate is receiving the load resulting from the object.

5 Claims, 9 Drawing Sheets

ROTARY MEASURING DEVICE

CROSS-REFERENCE TO RELATED APPLICATIONS

This U.S. national phase application of the international application No. PCT/JP2006/325370 claims priority to Japanese Patent Application No. 2005-368008 filed on Dec. 21, 2005 and Japanese Patent Application No. 2006-033352 filed on Feb. 10, 2006. The entire disclosures of Japanese Patent Application Nos. 2005-368008 and 2006-033352 are hereby incorporated herein by reference.

TECHNICAL FIELD

The present invention relates to a rotary measuring device that measures the weight of an object.

BACKGROUND ART

Conventionally, rotary measuring devices that measure the weight of an object while causing the object to rotate have been utilized. In such rotary measuring devices, oftentimes a load cell having a measuring function is attached below a measuring plate or a belt conveyor on which the object is placed, and the load cell measures the load that the load cell receives while rotating together with the object. At this time, not just the total weight of the weight of the tare such as a measuring plate and the weight of the object, but also error resulting from rotation is included in the measured value outputted from the load cell.

Figure 1:
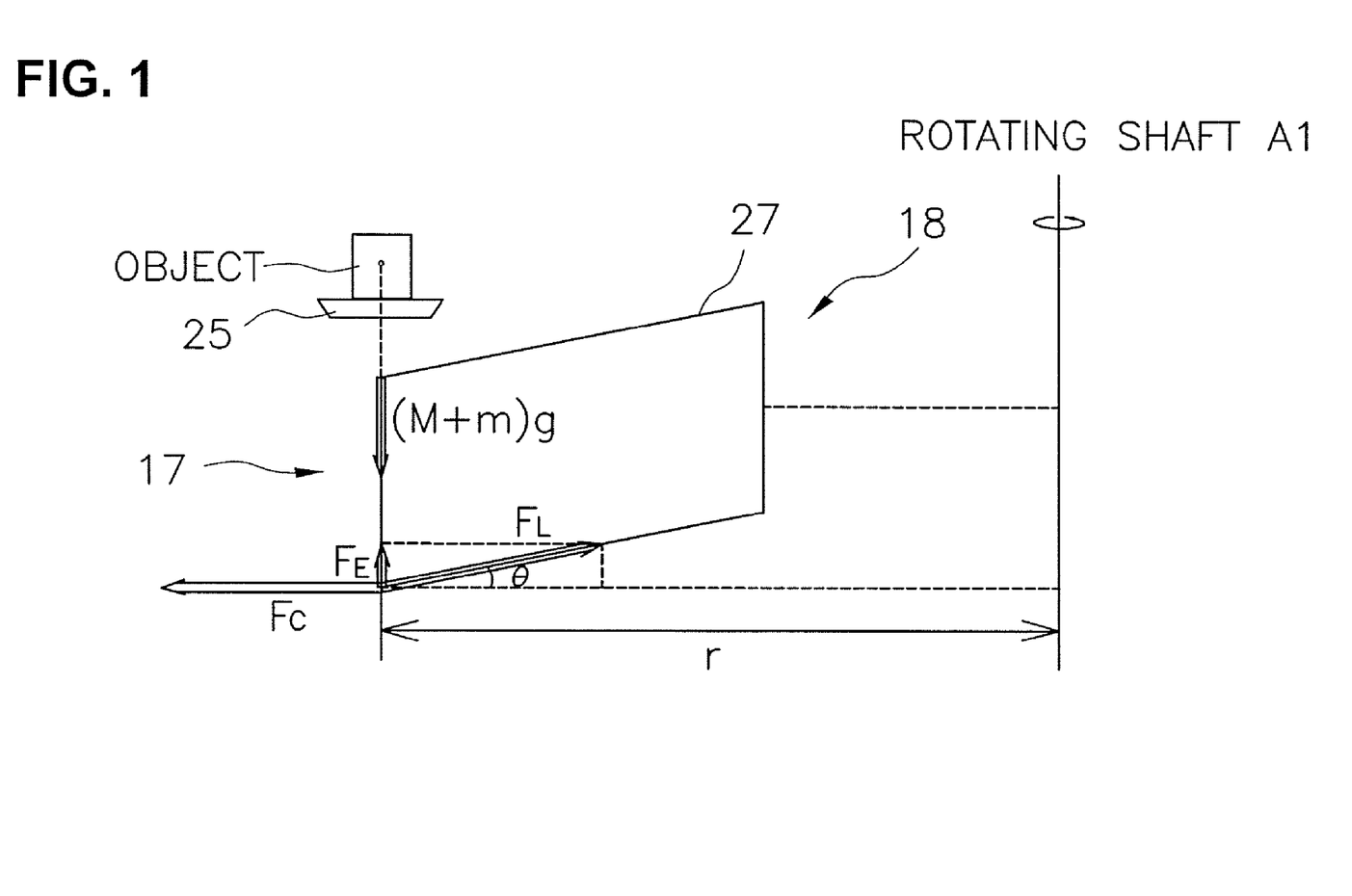
FIG. 1 is a diagram schematically showing a load applied to a load cell of a rotary measuring device.

An example of error resulting from rotation will now be explained. For example, as shown in FIG. 1, a case will be considered where a load cell 27 has a structure including a free end 17 and a fixed end 18. In this case, in the vicinity of the free end 17 of the load cell 27, the weight of the tare such as a measuring plate 25 and the weight of an object are loaded, whereby angular displacement occurs with respect to the horizontal plane. When the tare and the object rotate in a state where such angular displacement is occurring, a force $F_L$ acting on the load cell 27 also slants at an angle $\theta$ with respect to the radial direction so as to counter a centrifugal force $F_C$ acting on the tare and the object. Additionally, as a result, a force $F_E$ of a size of $|F_C|\tan\theta$ is loaded in the vertical direction on the load cell 27 as error resulting from rotation.

Japanese Patent No. 2,794,472 discloses an aspect where the weight of an object is measured in consideration of the aforementioned error (called "centrifugal force error" below) resulting from rotation which occurs stemming from centrifugal force.

DISCLOSURE OF THE INVENTION

In the rotary measuring device of Japanese Patent No. 2,794,472, angular displacement with respect to the horizontal plane of the load cell is regarded as a constant when considering centrifugal force error. However, in actuality, such angular displacement changes in response to the load that the load cell receives. For this reason, in the rotary measuring device of Japanese Patent No. 2,794,472, accurately considering centrifugal force error is difficult.

It is an object of the present invention to provide a rotary measuring device that can more accurately measure the weight of an object by more accurately considering centrifugal force error.

A rotary measuring device pertaining to a first aspect of the present invention includes a measuring unit, a rotational drive unit, a centrifugal force error calculating unit and a weight value calculating unit, and measures the weight of an object. The measuring unit includes a load receiving portion and a load detecting portion. The load receiving portion is configured and arranged to receive a load resulting from the object. The load detecting portion has a fixed end and a free end on which the load receiving portion is disposed. The rotational drive unit is configured and arranged to rotate the measuring unit. The centrifugal force error calculating unit is configured to calculate, on the basis of a first measured value, an angular displacement value of the load detecting portion in the vicinity of the free end with respect to a horizontal plane of. The first measured value is a measured value outputted from the load detecting portion in a state where the measuring unit is rotating. The weight value calculating unit is configured to calculate a weight value of the object on the basis of the angular displacement value and a second measured value. The second measured value is a measured value outputted from the load detecting portion in a state where the load receiving portion is receiving the load resulting from the object.

In this rotary measuring device, the angular displacement value of the load detecting portion in the vicinity of the free end with respect to the horizontal plane is calculated on the basis of a measured value (first measured value) in a state where the measuring unit is rotating. Here, the measured value (first measured value) in a state where the measuring unit is rotating may be a measured value in a state where the load receiving portion is receiving a load resulting from an object (including an object-to-be-measured and other arbitrary objects), or may be a measured value in a state where the load receiving portion is not receiving a load resulting from an object (including an object-to-be-measured and other arbitrary objects). Further, the angular displacement value calculated at this time is an angular displacement value in a state where the load receiving portion is receiving the load resulting from the object (object-to-be measured). Additionally, the actual weight value of the object (object-to-be-measured) is calculated on the basis of the calculated angular displacement value and a measured value (second measured value) in a state where the load receiving portion is receiving the load resulting from the object (object-to-be-measured). In this manner, in this rotary measuring device, the angular displacement value with respect to the horizontal plane of the load detecting portion in the vicinity of the free end is considered, whereby it becomes possible to more accurately consider centrifugal force error and the weight of the object (object-to-be-measured) can be measured more accurately.

It will be noted that included in calculating the angular displacement value is calculating a function depending on just the angular displacement value (angle $\theta$) such as $\tan\theta$.

A rotary measuring device pertaining to a second aspect of the present invention is the rotary measuring device pertaining to the first aspect, wherein the centrifugal force error calculating unit includes an angular displacement function calculating section. The angular displacement function calculating section is configured to calculate, on the basis of the first measured value, a function representing the angular displacement value depending on the load that the free end receives.

In this rotary measuring device, the function representing the angular displacement value depending on the load that the free end receives is calculated on the basis of a measured value (first measured value) in a state where the measuring unit is rotating. Thus, in this rotary measuring device, in regard to various objects (objects-to-be-measured) having various weights, the angular displacement value in a state where the load receiving portion is receiving the load resulting from the object (object-to-be-measured) can be calculated easily.

A rotary measuring device pertaining to a third aspect of the present invention is the rotary measuring device pertaining to the second aspect, wherein the centrifugal force error calculating unit further includes an initial load calculating section. The initial load calculating section is configured to calculate a weight value of the load receiving portion on the basis of the first measured value.

In this rotary measuring device, the weight value of the load receiving portion is calculated on the basis of a measured value (first measured value) obtained while the measuring unit is rotating. Thus, in this rotary measuring device, the angular displacement value can be calculated more accurately in consideration of the actual weight of the load receiving portion.

A rotary measuring device pertaining to a fourth aspect of the present invention is the rotary measuring device pertaining to the third aspect, wherein the centrifugal force error calculating unit further includes a turning radius calculating section. The turning radius calculating section is configured to calculate a turning radius on the basis of the first measured value. The turning radius is the distance between the free end and a rotational center of the measuring unit.

In this rotary measuring device, the turning radius is calculated on the basis of a measured value (first measured value) in a state where the measuring unit is rotating. Thus, in this rotary measuring device, the angular displacement value can be calculated more accurately in consideration of the actual turning radius.

A rotary measuring device pertaining to a fifth aspect of the present invention is the rotary measuring device pertaining to the fourth aspect, wherein the centrifugal force error calculating unit is configured to calculate the angular displacement value based on the first measured value that includes a measured value outputted from the load detecting portion in a state where the load receiving portion is not receiving a load resulting from an object and the measuring unit is rotating at a first rotational speed, a measured value outputted from the load detecting portion while the load receiving portion is not receiving a load resulting from an object and the measuring unit is rotating at a second rotational speed, a measured value outputted from the load detecting portion in a state where the load receiving portion is receiving a load resulting from an object having a rated maximum weight and the measuring unit is rotating at the first rotational speed, and a measured value outputted from the load detecting portion in a state where the load receiving portion is receiving a load resulting from an object having the rated maximum weight and the measuring unit is rotating at the second rotational speed.

In this rotary measuring device, the angular displacement value is calculated on the basis of four types of measured values (first measured values) in a total of four types of states which include combinations of two types of states where the load receiving portion is not receiving a load resulting from an object (including an object-to-be-measured and other arbitrary objects) and two types of states where the load receiving portion is receiving a load resulting from an object having the rated maximum weight of the load detecting portion. Thus, in this rotary measuring device, in regard to various objects (objects-to-be-measured) having various weights from zero to the rated maximum weight, the angular displacement value in a state where the load receiving portion is receiving the load resulting from the object (object-to-be-measured) can be calculated more accurately.

According to the rotary measuring device pertaining to the present invention, by considering the angular displacement value with respect to the horizontal plane of the load detecting portion in the vicinity of the free end, it becomes possible to more accurately consider centrifugal force error, and the weight of an object (object-to-be-measured) can be measured more accurately.

DETAILED DESCRIPTION OF PREFERRED EMBODIMENTS

Below, a rotary measuring device 1 pertaining to an embodiment of the present invention will be described with reference to FIG. 1 to FIG. 9.

Configuration of Rotary Measuring Device 1

Figure 2:
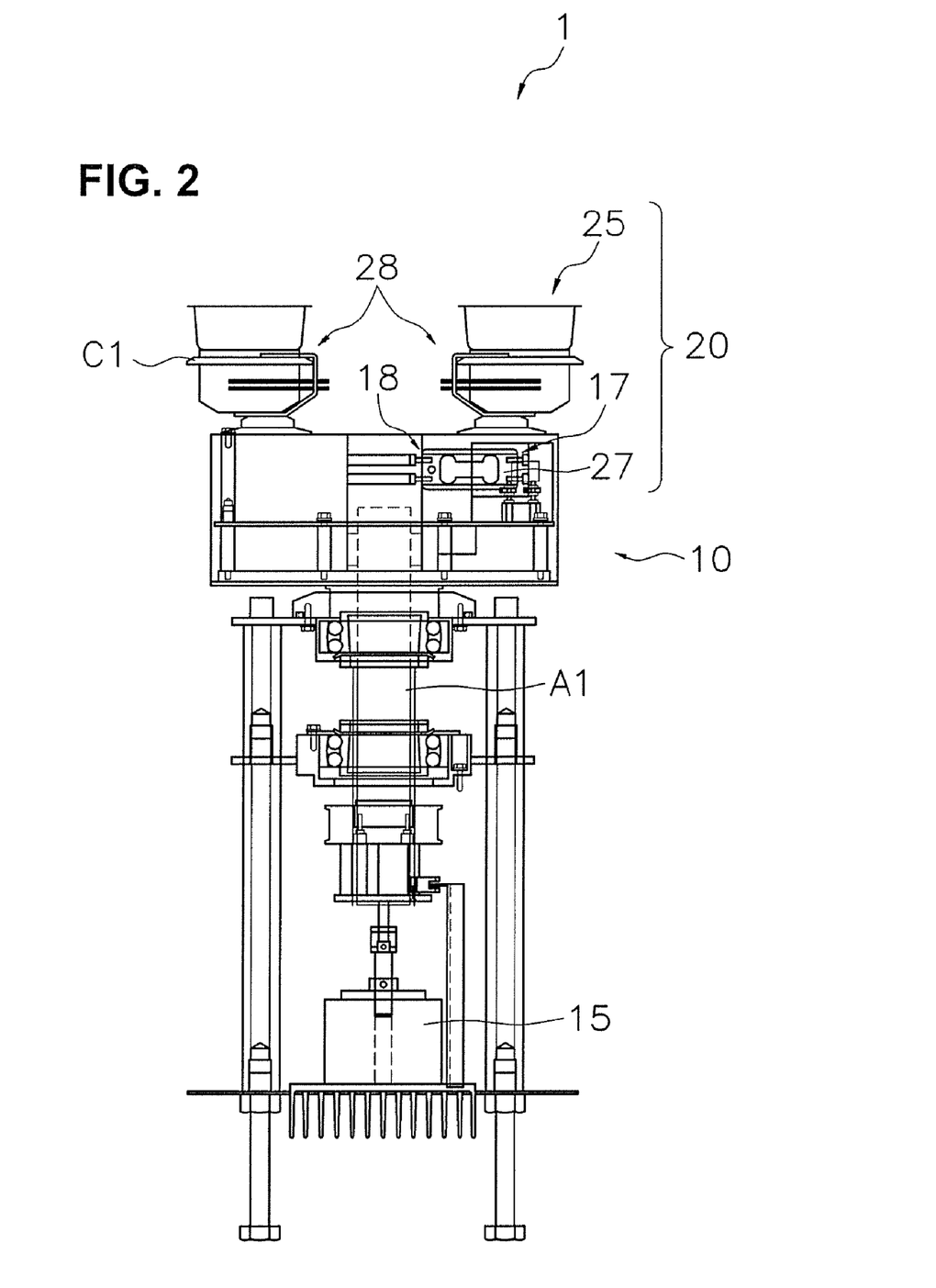
FIG. 2 is a front sectional diagram of a rotary measuring device pertaining to an embodiment of the present invention.
Figure 3:
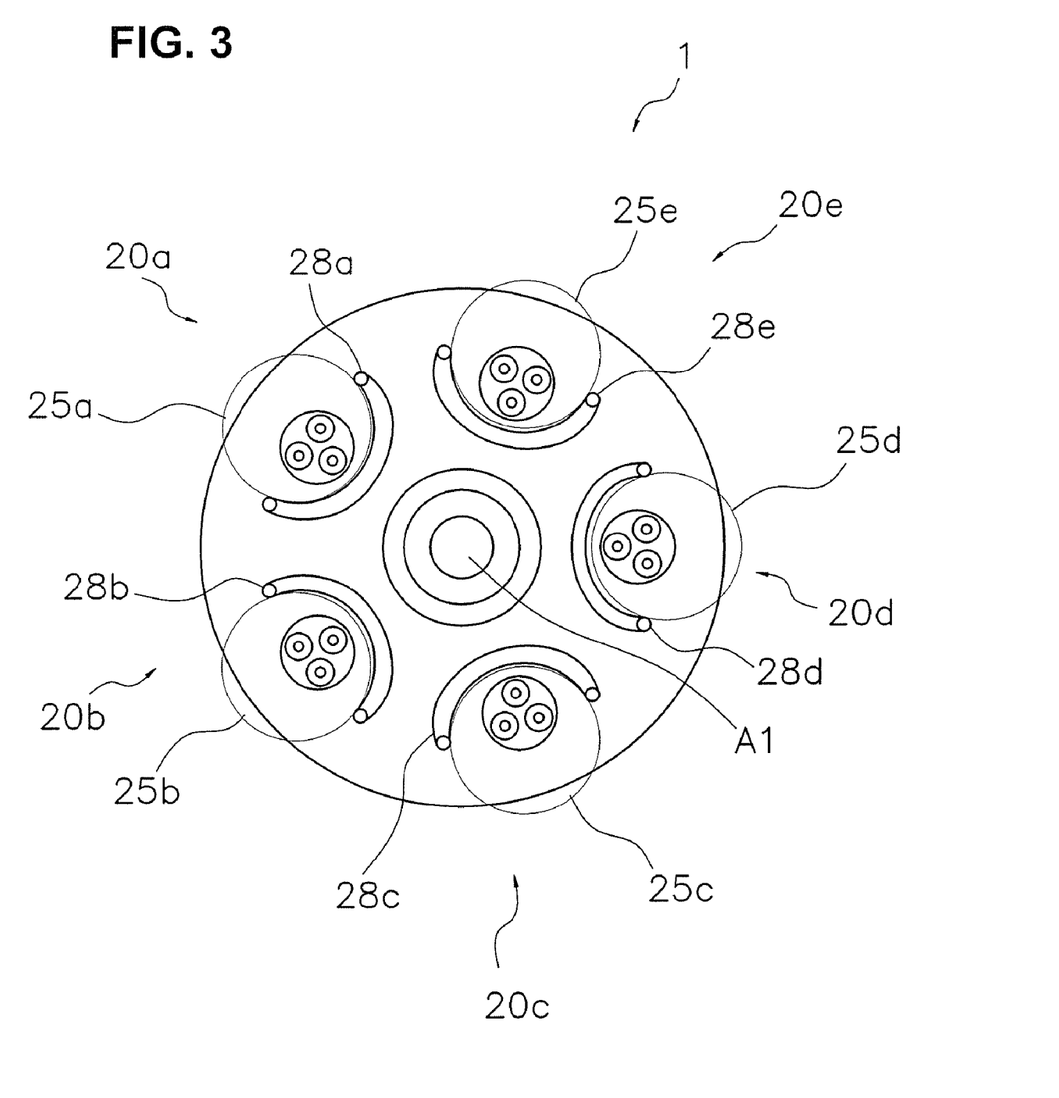
FIG. 3 is a plan diagram of the rotary measuring device of FIG. 2.

As shown in FIG. 2 and FIG. 3, the rotary measuring device 1 includes a motor 15 (one example of the rotational drive unit) that rotates a rotating shaft A1, a plurality of (in the present embodiment, five) measuring units 20a to 20e that are fixed to the rotating shaft A1 and rotate about the rotating shaft A1 together with the rotating shaft A1, and a control unit 30 (see FIG. 5) that controls the operation of each part of the rotary measuring device 1. Additionally, the measuring units 20a to 20e include load cells 27a to 27e (examples of the load detecting portion) (see FIG. 5), holders 28a to 28e disposed so as to correspond to the load cells 27a to 27e, and measuring plates 25a to 25e (examples of the load receiving portion) that the holders 28a to 28e hold, respectively.

Motor 15

The motor 15 is inverter-controlled and is configured and arranged to rotate the rotating shaft A1 at an arbitrary rotation speed in response to a command from the control unit 30. A circular box 10 is fixed to the rotating shaft A1, and the circular box 10 rotates at the same rotation speed as the rotating shaft A1.

Measuring Units 20

Figure 4:
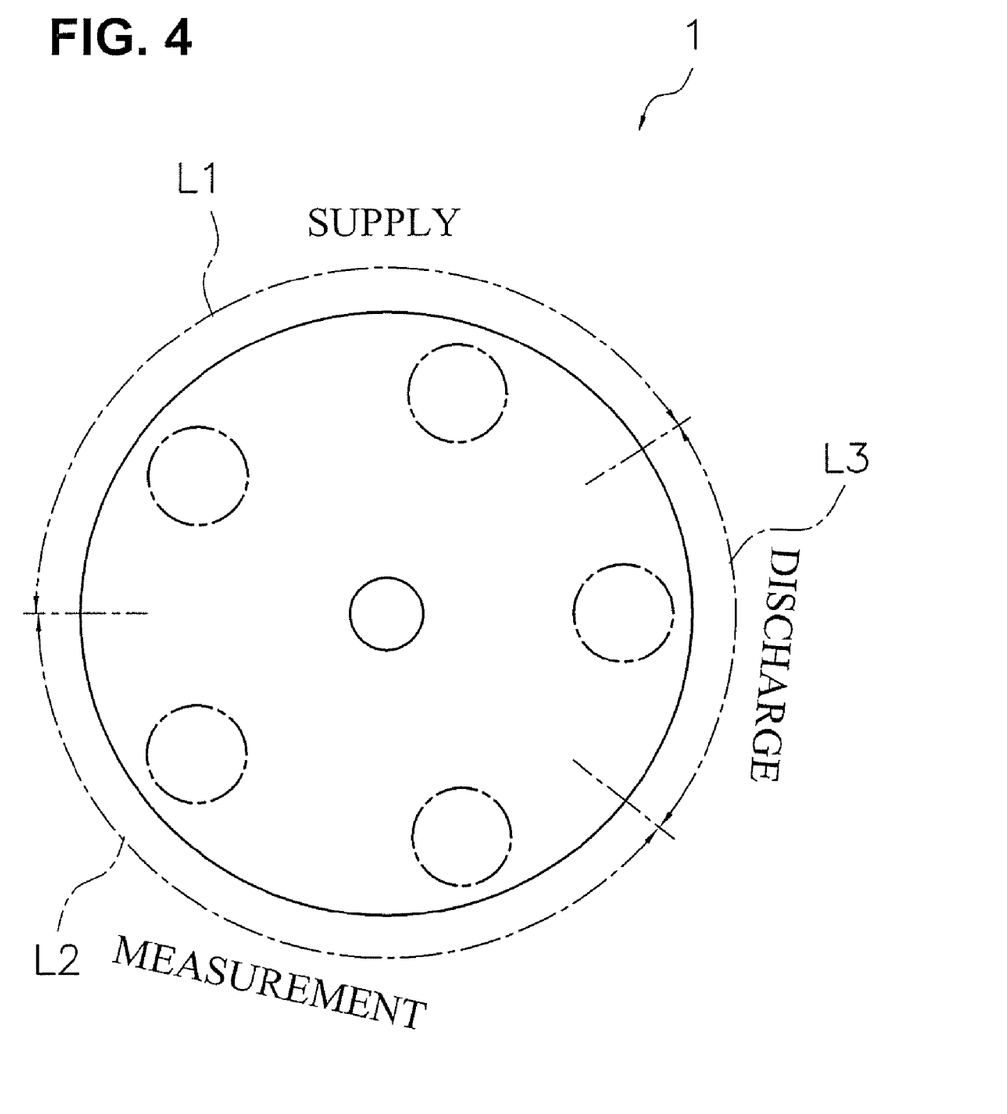
FIG. 4 is a diagram showing an aspect of a measuring plate during rotation in the rotary measuring device of FIG. 2.

The measuring units 20a to 20e rotate at a prescribed rotation speed about the rotating shaft A1. Additionally, while the measuring units 20a to 20e rotate once about the rotating shaft A1, objects are supplied to the measuring plates 25a to 25e, the supplied objects are measured, and the measured objects are discharged from the measuring plates 25a to 25e. More specifically, in the rotary measuring device 1, as shown in FIG. 4, a supply area L1, a measurement area L2, and a discharge area L3 are set along the rotational trajectory of the measuring plates 25a to 25e. In the supply area L1, objects are supplied to the empty measuring plates 25a to 25e by an supply unit (not shown in Figures). In the measurement area L2, the weights of the objects that have been supplied to the measuring plates 25a to 25e are measured by the load cells 27a to 27e together with the weights of the measuring plates 25a to 25e and the holders 28a to 28e (below, tares). Next, in the discharge area L3, the objects after measurement are discharged by an discharge unit (not shown in Figures) from the measuring plates 25a to 25e to the outside of the rotational trajectory of the measuring plates 25a to 25e. Then, the measuring plates 25a to 25e for which the process from supply to discharge of the objects has ended are again sent to the process from supply to discharge of the next objects.

Holders 28

The holders 28a to 28e include bottom panels that support the measuring plates 25a to 25e from below and U-shaped members, and the holders 28a to 28e hold the measuring plates 25a to 25e between the bottom panels and the U-shaped members by placing the U-shaped members along flange portions C1 formed on the outer peripheries of the measuring plates 25a to 25e. Moreover, magnets (permanent magnets) are embedded in the bottom panels of the holders 28 so that the metal measuring plates 25a to 25e are more securely held by the magnetic force of these magnets. It will be noted that the magnets may also be embedded in side walls rather than the bottom panels, or may also be embedded in both the bottom panels and the side walls. Further, in addition to or instead of being held by the magnets, the measuring plates 25a to 25e may also be mechanically held by disposing appropriate engaging portions in the holders 28a to 28e, or in the measuring plates 25a to 25e, or in both, and the like. Further, the measuring plates 25a to 25e may also be held by strictly designing the holders 28a to 28e and the measuring plates 25a to 25e to abut against each other rather than disposing a special holding mechanism having magnets, engaging portions, or the like.

Further, as shown in FIG. 2 and FIG. 3, the holders 28a to 28e are fixed on the circular box 10 and arranged at equidistant intervals in the circumferential direction of the circular box 10. Consequently, the holders 28a to 28e rotate at the same rotation speed as the circular box 10 in accordance with the rotation of the circular box 10 while holding the measuring plates 25a to 25e respectively.

Measuring Plates 25

The measuring plates 25a to 25e are configured such that objects can be placed thereon. When objects are placed on the measuring plates 25a to 25e, the weights of the objects are loaded on the measuring plates 25a to 25e. Additionally, as shown in FIG. 1, the load that the measuring plate 25 receives travels to the free end 17 of the load cell 27 together with the weight of the tare including the measuring plate 25 and causes the load cell 27 to be angularly displaced with respect to a horizontal plate in the vicinity of the free end 17.

Load Cells 27

As shown in FIG. 2, the load cells 27a to 27e are fixed inside the circular box 10 and arranged at equidistant intervals in the circumferential direction of the circular box 10. Consequently, the load cells 27a to 27e rotate at the same rotation speed as the circular box 10 in accordance with the rotation of the circular box 10 together with the holders 28a to 28e and the measuring plates 25a to 25e. That is, measurement by the load cells 27a to 27e is performed in a state where the load cells 27a to 27e, the measuring plates 25a to 25e, and the holders 28a to 28e are relatively stopped. Thus, even when the measuring plates 25a to 25e are rotated, the similar accurate measurement can be performed as when the rotation of the measuring plates 25a to 25e is stopped.

Further, as shown in FIG. 1, the load cell 27 includes the free end 17 and fixed end 18, and the load cell 27 detects and measures the load that the free end 17 receives and outputs the measured value to the control unit 30. As shown in FIG. 2, the measuring plate 25 is disposed above the free end 17 of the load cell 27 in the vertical direction, and the weight of an object placed on the measuring plate 25 and the weight of the tare are loaded on the free end 17. Consequently, not just the weight of the object placed on the measuring plate 25 and the weight of the tare, but also error resulting from rotation such as centrifugal force error stemming from angular displacement $\theta$ (angular displacement value) with respect to the horizontal place of the load cell 27 is included in the measured value outputted from the load cell 27, that is, the load that the free end 17 receives.

Control Unit 30

Figure 5:
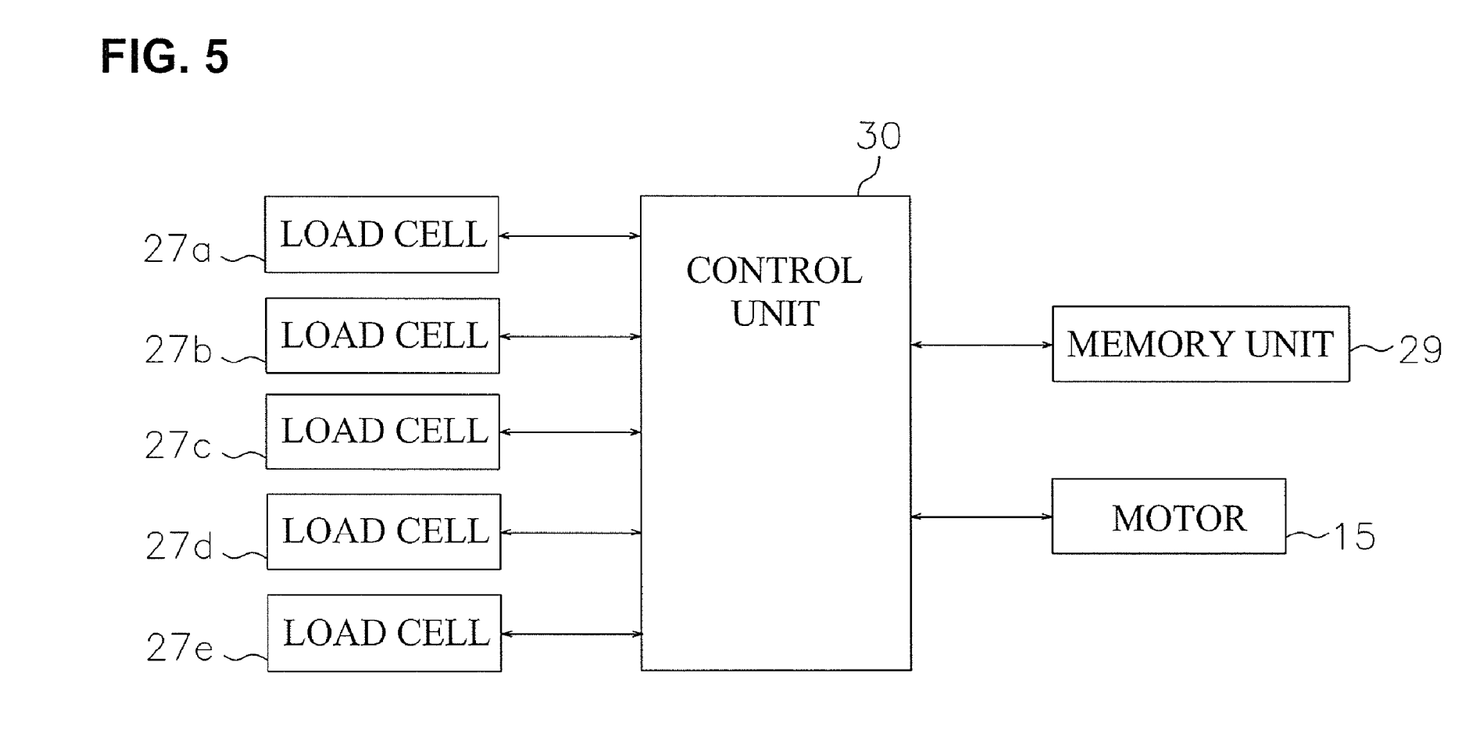
FIG. 5 is a diagram showing the functional configuration of the rotary measuring device of FIG. 2.

As shown in FIG. 5, the control unit 30 is connected to the load cells 27a to 27e, a memory unit 29 and the motor 15. Thus, the control unit 30 can control the operation of each part of the rotary measuring device 1 by reading and executing programs stored in the memory unit 29. Additionally, on the basis of the measured values outputted from the load cells 27a to 27e, the control unit 30 calculates the actual weight values of the objects placed on the measuring plates 25a to 25e. The actual weight values of the objects that have been calculated are saved in the memory unit 29 and outputted in a format that an operator has set via an setting input unit (not shown in Figures) such as operation keys. For example, the actual weight values are displayed on an monitor (not shown in Figures) attached to the rotary measuring device 1 or are sent to a downstream device included in the same production line as the rotary measuring device 1.

Figure 6:
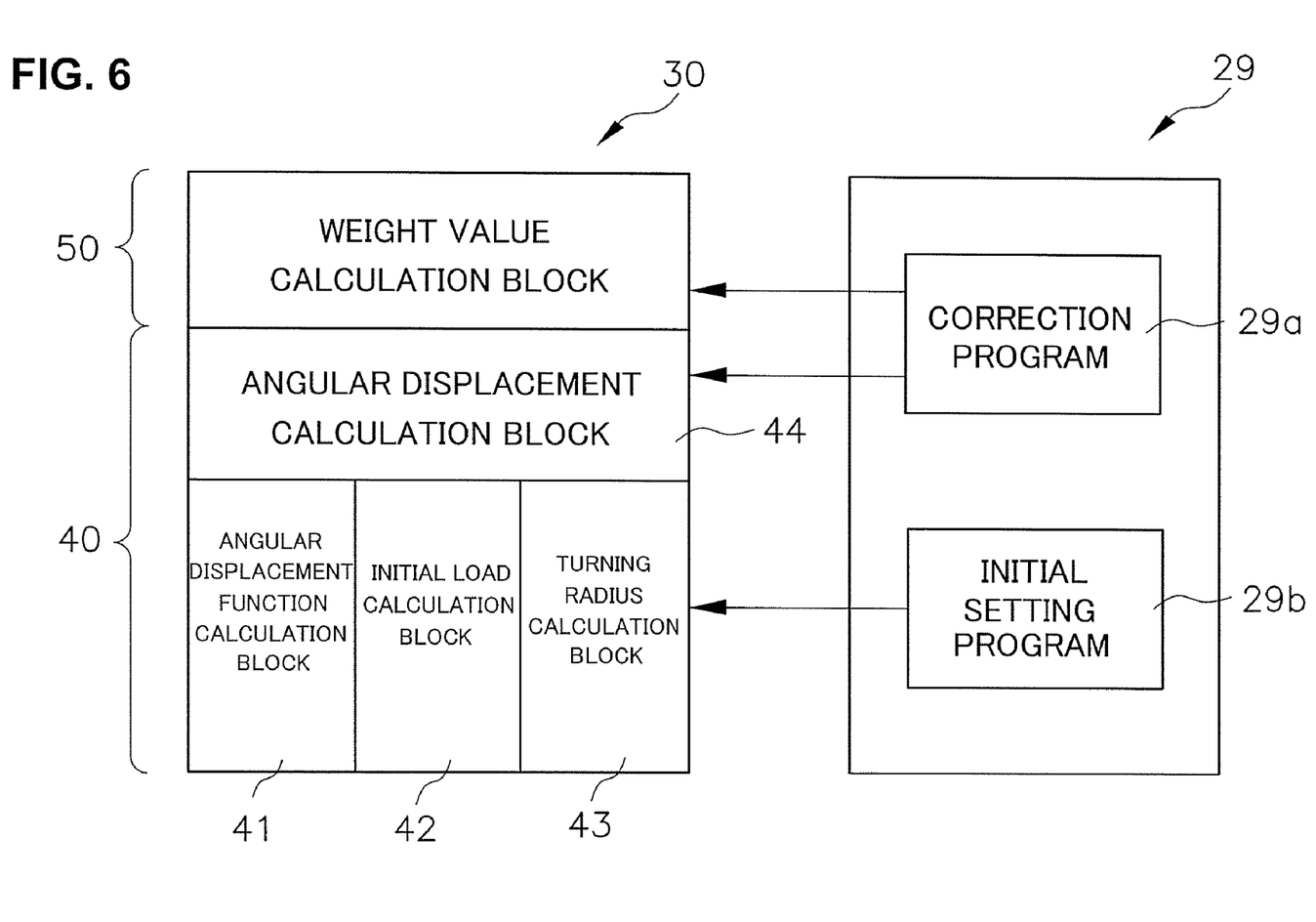
FIG. 6 is a diagram schematically showing the functions of a control unit of the rotary measuring device of FIG. 2.

Further, as shown in FIG. 6, the control unit 30 functions as a centrifugal force error calculation block 40 (one example of the centrifugal force error calculating unit) and a weight value calculation block 50 (one example of the weight value calculating unit) by reading and executing a correction program 29a and an initial setting program 29b stored in the memory unit 29. The centrifugal force error calculation block 40 calculates the angular displacements $\theta$ that are needed in order to consider the centrifugal force error included in the measured values outputted from the load cells 27a to 27e in a state where objects (objects-to-be-measured) have been placed on the measuring plates 25a to 25e. The weight value calculation block 50 calculates the actual weight values of the objects (objects-to-be-measured) on the basis of the angular displacements $\theta$ calculated by the centrifugal force error calculation block 40.

Further, the centrifugal force error calculation block 40 includes an angular displacement function calculation block 41 (one example of the angular displacement function calculating section), an initial load calculation block 42 (one example of the initial load calculating section), a turning radius calculation block 43 (one example of the turning radius calculating section) and an angular displacement calculation block 44. The angular displacement function calculation block 41 calculates a function representing the angular displacement θ (the angular displacement value) depending on the load that the free end 17 receives. The initial load calculation block 42 calculates the initial load that the free end 17 receives. It will be noted that the initial load that the free end 17 receives is a load that the free end 17 receives in an initial state where no objects have been placed on the measuring plates 25a to 25e and where the measuring units 20a to 20e are not rotating, and is equivalent to the weight of the tare. The turning radius calculation block 43 calculates a turning radius that is the distance between the free end 17 and a rotational center of the measuring units 20a to 20e. The angular displacement calculation block 44 calculates, on the basis of the calculation results in the blocks 41 to 43, the specific angular displacement θ in a state where objects (objects-to-be-measured) have been placed on the measuring plates 25a to 25e.

Measurement Processing in Rotary Measuring Device 1

Initial Setting Processing

Below, initial setting processing in the rotary measuring device 1 will be described with reference to FIG. 7. The initial setting processing is processing that calculates parameters that are needed in order to calculate the actual weight values of objects (objects-to-be-measured) before performing measurement processing in a state where the objects (objects-to-be-measured) have actually been placed on the measuring plates 25.

In step S71, the control unit 30 rotates the measuring plate 25 in a state where no objects have been placed thereon, that is, the measuring plate 25 in a state where just the tare weight is loaded on the free end 17 of the load cell 27, at a rotation speed $R_1$ (rpm) (e.g., 30 rpm). In this state, the load cell 27 outputs a measured value $F_1$ (N). It will be noted that the angular speed corresponding to this rotation speed $R_1$ is $\omega_1$ ($\omega_1 = 2\pi R_1/60$) (rad/s).

Next, in step S72, the control unit 30 is configured to rotate the measuring plate 25 in a state where no objects have been placed thereon, that is, the measuring plate 25 in a state where just the tare weight is loaded on the free end 17 of the load cell 27, at a rotation speed $R_2$ (rpm) (e.g., 60 rpm). In this state, the load cell 27 outputs a measured value $F_2$ (N). It will be noted that the angular speed corresponding to this rotation speed $R_2$ is $\omega_2$ ($\omega_2 = 2\pi R_2/60$) (rad/s).

Next, in step S73, the control unit 30 is configured to rotate the measuring plate 25 in a state where an object having the same weight as the rated maximum weight (e.g., weight of an object with a mass of 5 kg) of the load cell 27 has been placed thereon, that is, the measuring plate 25 in a state where the total weight of the tare weight and the rated maximum weight of the load cell 27 is loaded on the free end 17 of the load cell 27, at the rotation speed $R_1$. In this state, the load cell 27 outputs a measured value $F_3$ (N).

Next, in step S74, the control unit 30 is configured to rotate the measuring plate 25 in a state where an object having the same weight as the rated maximum weight of the load cell 27 has been placed thereon, that is, the measuring plate 25 in a state where the total weight of the tare weight and the rated maximum weight of the load cell 27 is loaded on the free end 17 of the load cell 27, at the rotation speed $R_2$. In this state, the load cell 27 outputs a measured value $F_4$ (N).

Next, in step S75, the control unit 30 functions as the angular displacement function calculation block 41, the initial load calculation block 42, and the turning radius calculation block 43. The blocks 41 to 43 operate mutually cooperatively, so that the blocks 41 to 43 calculate, respectively, a function representing the angular displacement θ depending on the load that the free end 17 of the load cell 27 receives, the tare weight value (initial load value), and the turning radius that is the distance between the free end 17 and the rotational center of the measuring unit 20, on the basis of the measured values $F_1$ to $F_4$ outputted from the load cell 27 in steps S71 to S74.

In step S75, calculation is performed in accordance with the following derivation principle.

As shown in FIG. 1, the total weight of the tare weight and the weight of the object placed on the measuring plate 25 is loaded downward in the vertical direction on the load cell 27, and a force $F_E$ resulting from centrifugal force error is also loaded upward in the vertical direction on the load cell 27. Consequently, when F (N) represents the load that the free end 17 of the load cell 27 receives, M (kg) represents the mass of the tare, m (kg) represents the mass of the object placed on the measuring plate 25, r (m) represents the turning radius, ω (rad/s) represents the angular speed, and g (m/s²) represents gravitational acceleration, then usually the following relationship is established between these physical values:

$$F = (M+m)g - (M+m)r\omega^2 \tan\theta \quad (1)$$

At this time, this becomes:

$$|F_E| = (M+m)r\omega^2 \tan\theta \quad (2)$$

Moreover, the angular displacement θ (rad) indicative of the angular displacement with respect to the horizontal plane of the load cell 27 in the vicinity of the free end 17 is represented by:

$$\theta = \theta_0 + \alpha F \quad (3)$$

Here, the value $\theta_0$ is the initial angular displacement in a state where the free end 17 is not receiving a load, and α is a constant. The above expression (3) means that the angular displacement θ is proportional to the load F that the free end 17 receives.

Here, when the above expression (3) is substituted in the above expression (1), then it becomes:

$$F = (M+m)g - (M+m)r\omega^2 \tan(\theta_0 + \alpha F) \quad (4)$$

When the measurement results in steps S71 to S74 are substituted in the above expression (4), then the following four expressions (5) to (8) are obtained.

$$F_1 = Mg - Mr\omega_1^2 \tan(\theta_0 + \alpha F_1) \quad (5)$$

$$F_2 = Mg - Mr\omega_2^2 \tan(\theta_0 + \alpha F_2) \quad (6)$$

$$F_3 = (M+m_{max})g - (M+m_{max})r\omega_1^2 \tan(\theta_0 + \alpha F_3) \quad (7)$$

$$F_4 = (M+m_{max})g - (M+m_{max})r\omega_2^2 \tan(\theta_0 + \alpha F_4) \quad (8)$$

Here, the value $m_{max}$ (kg) is the mass of an object having the rated maximum weight.

In step S75, the control unit 30 solves the above four expressions (5) to (8) for the four unknowns $\theta_0$, α, M, and r. That is, the function $\theta_0 + \alpha F$ representing the angular displacement θ depending on the force F that the free end 17 receives, the tare weight value (initial load value) M, and the turning radius r that is the distance between the free end 17 and the rotational center of the measuring unit 20 are, respectively, calculated by the angular displacement function calculation block 41, the initial load calculation block 42, and the turning radius calculation block 43. The four values of $\theta_0$, $\alpha$, M and r calculated at this time are stored in the memory unit 29 and utilized as parameters in later-described correction processing.

It will be noted that each of the measured values $F_1$ to $F_4$ outputted in steps S71 to S74 is the average value among a predetermined number of measured values, which are obtained from the predetermined number of measurements under a measurement condition corresponding to the step S71 to S74. Thus, measurement error can be minimized.

Further, in the present embodiment, steps S71 to S75 are executed for each of the five measuring units 20a to 20e, so that five sets, which correspond to respectively the measuring units 20a to 20e, of the parameters $\theta_0$, $\alpha$, M and r are stored in the memory unit 29. In this manner, because the parameters in later-described correction processing are calculated in accordance with the characteristics of each of the measuring units 20a to 20e, the actual weight values of the objects (objects-to-be-measured) can be calculated more accurately.

Measurement Processing

Figure 8:
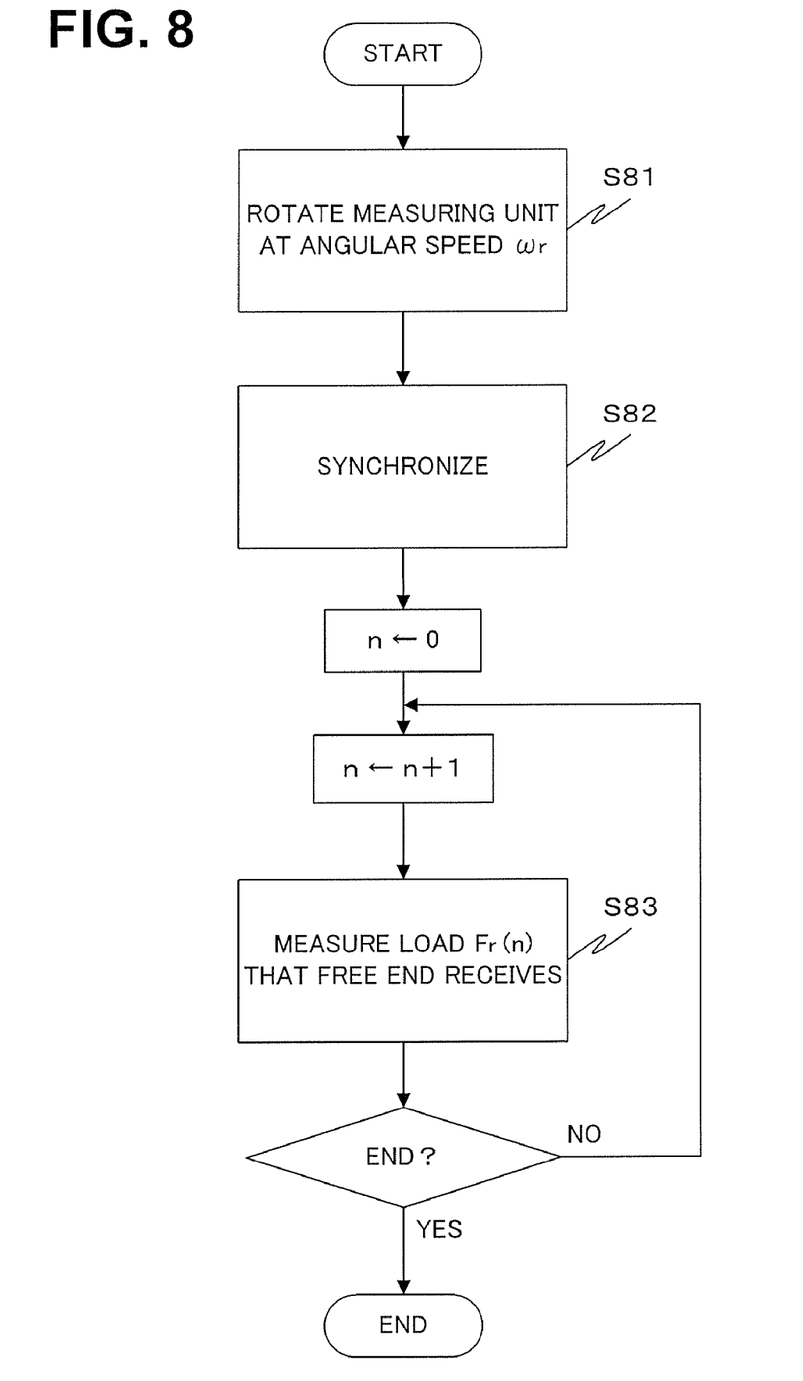
FIG. 8 is a flowchart showing measurement processing in a state where an object (object-to-be-measured) has actually been placed on the measuring plate in the rotary measuring device of FIG. 2.

Next, measurement processing in a state where objects (objects-to-be-measured) have actually been placed on the measuring plates 25 will be described with reference to FIG. 8. Each of the objects (objects-to-be-measured) is an object having a mass of about 1 kg, for example.

In step S81, the control unit 30 drives the motor 15 to rotate the measuring units 20 at a predetermined rotation speed $R_r$ (rpm) designated by the operator of the rotary measuring device 1. At this time, the value $R_r$ representing the rotation speed is stored in the memory unit 29 and utilized as a parameter in later-described correction processing. It will be noted that the angular speed corresponding to this rotation speed $R_r$ is $\omega_r$ ($\omega_r=2\pi R_r/60$) (rad/s).

Next, in step S82, the control unit 30 verifies whether or not the parts of the rotary measuring device 1 are synchronized with each other and whether or not the rotary measuring device 1 is synchronized with various types of devices included in the production line disposed downstream and upstream of the rotary measuring device 1. When synchronization has not been achieved, then the control unit 30 stands by until synchronization is achieved, and when synchronization has been achieved, then the control unit 30 proceeds to step S83.

In step S83, the load that the free end 17 of the load cell 27 receives is measured by the load cell 27 when the measuring plate 25 to which an object (object-to-be-measured) has been supplied passes through the measurement area L2, and the measured value is stored in the memory unit 29.

The measuring units 20 continue to rotate until a stop command is inputted from the operator of the rotary measuring device 1 or until a predetermined operation end time has been reached. Consequently, step S83 is repeated N times for N number (where N is a positive integer) of objects (objects-to-be-measured) until a stop command is inputted from the operator of the rotary measuring device 1 or until the predetermined operation end time has been reached. Here, the mass of the object (object-to-be-measured) that has been measured the $n^{th}$ time (n=1, 2, ..., N) is $m_r(n)$ (kg). Further, the control unit 30 stores the N number of measured values outputted from the load cells 27 associated with the measured order in the memory unit 29 as $F_r(n)$ (n=1, 2, ..., N) (N). The measured values $F_r(n)$ (n=1, 2, ..., N) stored in the memory unit 29 are utilized in later-described correction processing.

Correction Processing

Figure 9:
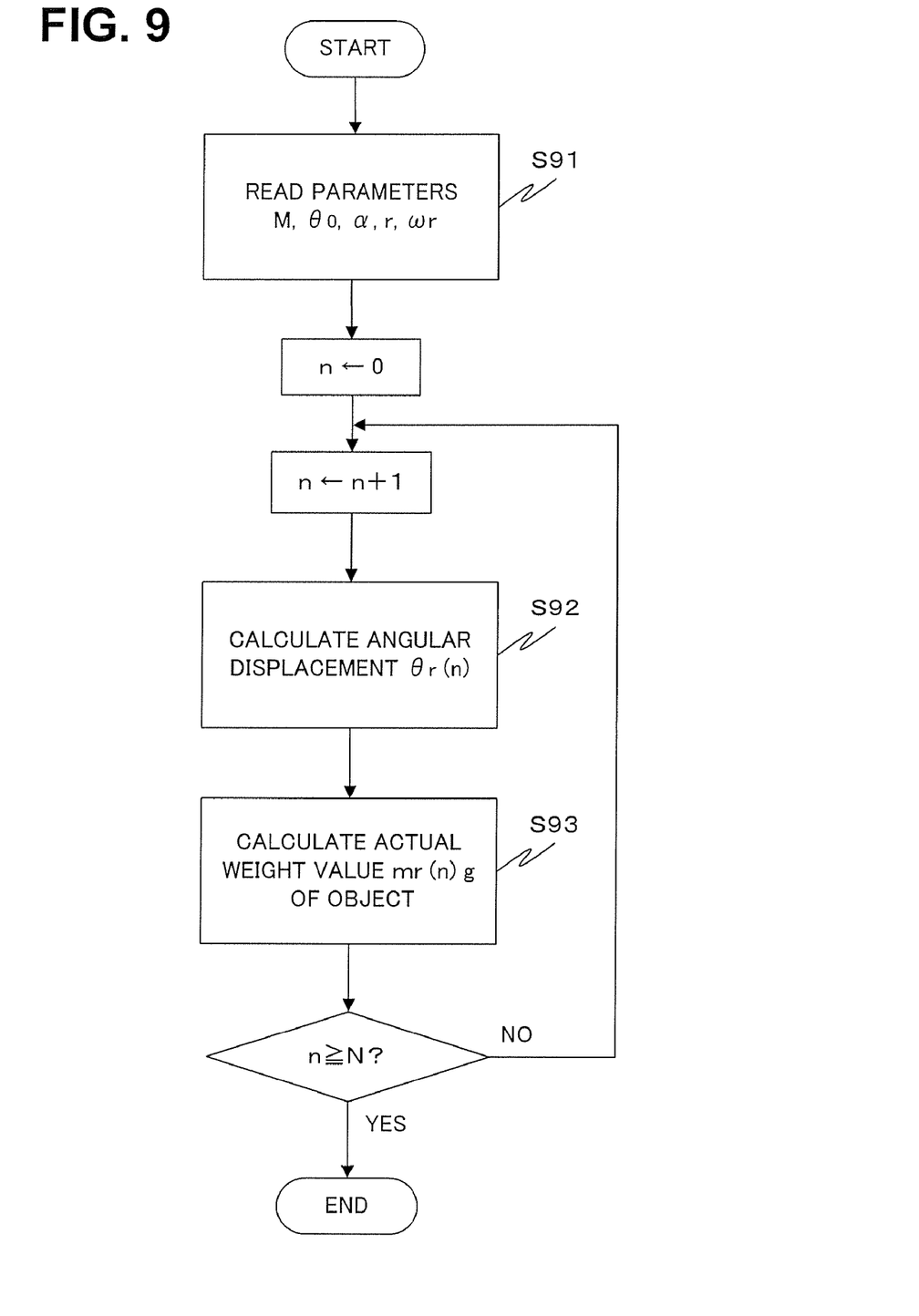
FIG. 9 is a flowchart showing correction processing in the rotary measuring device of FIG. 2.

Below, correction processing in the rotary measuring device 1 will be described with reference to FIG. 9. The correction processing is processing that corrects, on the basis of the parameters $\theta_0$, $\alpha$, M and r calculated by the initial setting processing, the measured values $F_r(n)$ (n=1, 2, ..., N) in a state where objects (objects-to-be-measured) have actually been placed on the measuring plates 25, to calculate the actual weight values of the objects (objects-to-be-measured). The correction processing is executed in parallel with the aforementioned measurement processing by the control unit 30.

In step S91, the control unit 30 functions as the centrifugal force error calculation block 40. The centrifugal force error calculation block 40 reads the parameters $\theta_0$, $\alpha$, M, r and $\omega_r$, and the measured values $F_r(n)$ (n=1, 2, ..., N) stored in the memory unit 29.

Next, in step S92, the angular displacement calculation block 44 calculates, on the basis of expression (9) below, the angular displacement $\theta_r(n)$ (n=1, 2, ..., N) (rad) in a state where an object (object-to-be-measured) with mass $m_r(n)$ (n=1, 2, ..., N) has been placed on the measuring plate 25.

$$\theta_r(n)=\theta_0+\alpha F_r(n)\ (n=1, 2, \ldots, N) \tag{9}$$

It will be noted that the above expression (9) is obtained by the above expression (3).

Next, in step S93, the control unit 30 functions as the weight value calculation block 50. The weight value calculation block 50 calculates, on the basis of the angular displacement $\theta_r(n)$ (n=1, 2, ..., N) calculated in step S92, the actual mass value $m_r(n)$ (n=1, 2, ..., N) of the object (object-to-be-measured) from the following expression (10).

$$m_r(n)=F_r(n)/[g-r\omega_r^2 \tan \theta_r(n)]-M\ (n=1, 2, \ldots, N) \tag{10}$$

It will be noted that the above expression (10) is one where known values are substituted in an expression obtained by transforming the above expression (1).

Then, the weight value calculation block 50 calculates the actual weight value of the object (object-to-be-measured) by multiplying the gravitational acceleration g by the actual mass value $m_r(n)$ (n=1, 2, ..., N) of the object (object-to-be-measured) calculated by expression (10).

Then, the control unit 30 repeats steps S92 and S93 N times for n=1, ..., N.

It will be noted that the set of parameters $\theta_0$, $\alpha$, M and r utilized in steps S92 and S93 is selected from the five sets of parameters $\theta_0$, $\alpha$, M and r stored in the memory unit 29, corresponding to that one unit of the measuring units 20a to 20e to which the object (object-to-be-measured) to be calculated has been supplied.

In this rotary measuring device 1, the angular displacement $\theta$ with respect to the horizontal plane of the load cell 27 in the vicinity of the free end 17 in a state where an object (object-to-be-measured) has been placed on the measuring plate 25 is calculated on the basis of measured values (first measured values) in a state where the measuring unit 20 is rotating. Additionally, the actual weight value $m_r(n)$ g (n=1, 2, ..., N) of the object (object-to-be-measured) is calculated on the basis of the calculated angular displacement $\theta$ and a measured value (second measured value) in a state where the object (object-to-be-measured) has been placed on the measuring plate 25. In this manner, in this rotary measuring device 1, by considering the angular displacement θ in a state where an object (object-to-be-measured) has been placed on the measuring plate 25, it becomes possible to more accurately consider centrifugal force error, and the weight of the object (object-to-be-measured) can be measured more accurately.

In this rotary measuring device 1, the angular displacement θ is calculated on the basis of measured values (first measured values) in a state where the measuring unit 20 is actually rotating. Thus, in this rotary measuring device 1, the angular displacement θ in a state where the measuring unit 20 is rotating can be calculated more accurately.

In this rotary measuring device 1, the function $\theta = \theta_0 + \alpha F$ representing the angular displacement θ depending on the load F that the free end 17 receives, the tare weight value (initial load value) M, and the turning radius r that is the distance between the free end 17 and the rotational center of the measuring unit 20 are calculated on the basis of measured values (first measured values) in a state where the measuring unit 20 is rotating. In this manner, in this rotary measuring device 1, it becomes possible to consider the angular displacement θ, the tare weight value (initial load value) M, and the turning radius r, and the weight of the object (object-to-be-measured) can be measured more accurately.

In this rotary measuring device 1, the parameters $\theta_0$, $\alpha$, M and r that are needed in order to calculate the actual weight value of an object (object-to-be-measured) are calculated in regard to four types of measured values (first measured values) in a total of four types of states which are two types of states where no objects have been placed on the measuring plate 25 and two types of states where an object having the rated maximum weight of the load cell 27 has been placed on the measuring plate 25. Thus, in this rotary measuring device 1, in regard to various objects (objects-to-be-measured) having various weights from zero to the rated maximum weight, the angular displacement θ in a state where the object (object-to-be-measured) has been placed on the measuring plate 25 can be measured more accurately.

Figure 7:
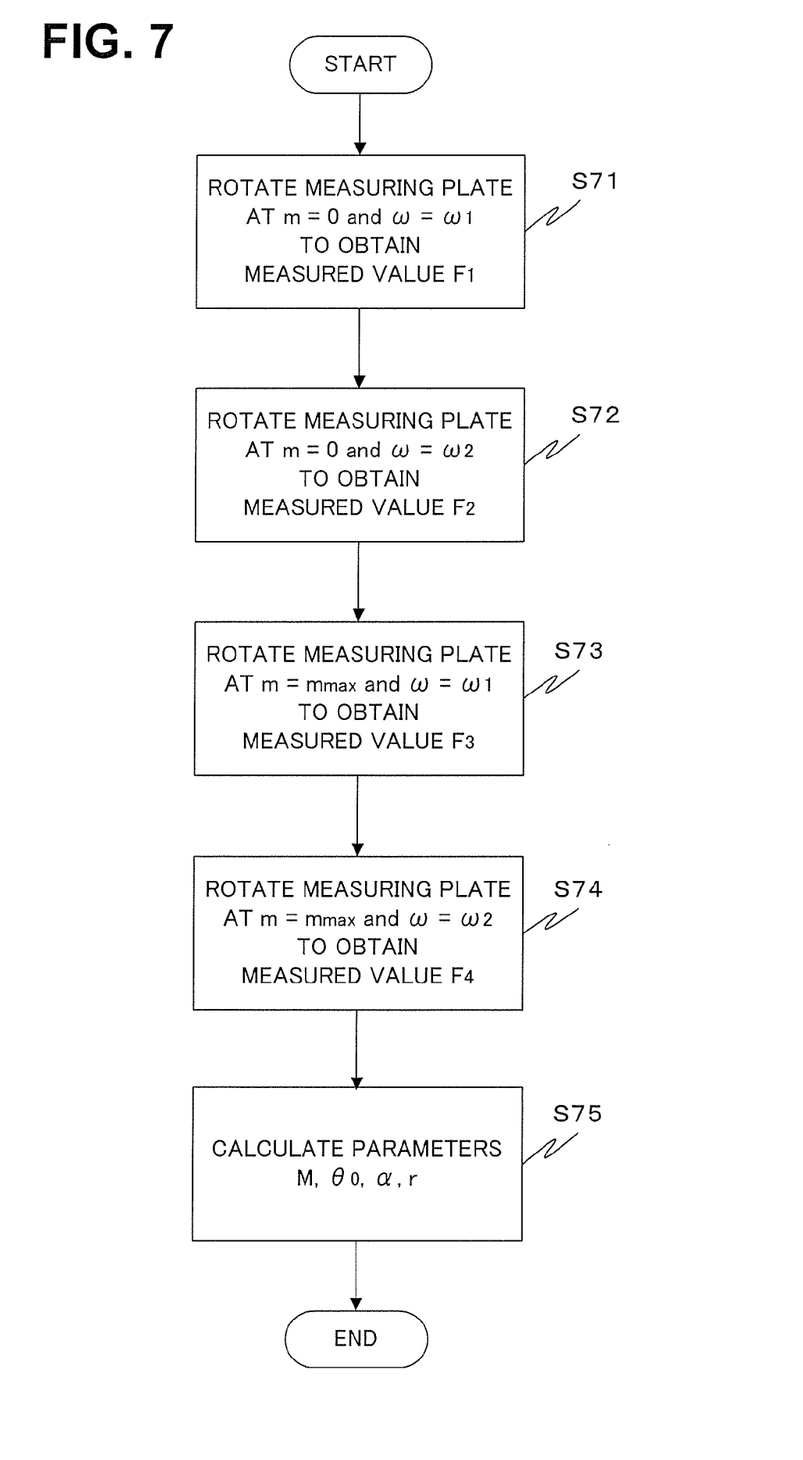
FIG. 7 is a flowchart showing initial setting processing in the rotary measuring device of FIG. 2.

In this rotary measuring device 1, the initial setting processing shown in FIG. 7 is executed for each of the five measuring units 20a to 20e, so that five sets, which correspond to respectively the measuring units 20a to 20e, of the parameters $\theta_0$, $\alpha$, M and r are stored in the memory unit 29. Additionally, when the actual weight value of the object (object-to-be-measured) is to be calculated, of the five sets of parameters $\theta_0$, $\alpha$, M and r stored in the memory unit 29, the set of parameters corresponding to that one unit of the measuring units 20a to 20e to which the object (object-to-be-measured) serving as calculation targets has been supplied is utilized. In this manner, because the parameters in the correction processing are calculated in accordance with the characteristics of each of the measuring units 20a to 20e, the actual weight values of the objects (objects-to-be-measured) can be calculated more accurately.

The measured values $F_1$ to $F_4$ in the initial setting processing shown in FIG. 7 are, after a predetermined number of measurements have been performed under respective measurement conditions, calculated by averaging these measured values. Thus, measurement error can be minimized.

Modified Embodiments

An embodiment of the present invention has been described above, but the present invention is not limited to the preceding embodiment and may be variously altered in a range that does not depart from the gist of the invention.

In the preceding embodiment, the four parameters $\theta_0$, $\alpha$, M and r were calculated on the basis of the measured values $F_1$ to $F_4$ in states where no objects were placed on the measuring plate 25 and in states where an object having the rated maximum weight was placed on the measuring plate 25, but it is also possible to calculate the parameters on the basis of four types of measured values in arbitrary four types of states.

The tare weight value (initial weight value) M and/or the turning radius r may be known values on the basis of design specifications. In this case, the number of parameters to be calculated decreases and calculation becomes easy.

In the preceding embodiment, the objects were placed on the measuring plates 25 which were held by the holders 28, but the measuring plates 25 may also be placed on the load cells 27 without being held by the holders 28, or the objects may be placed on a belt conveyor.

However, in a rotary measuring device that performs measurement processing while causing measuring plates to rotate as in the preceding embodiment, the centrifugal force acting on the measuring plates becomes greater as the rotation speed of the measuring plates becomes greater, and there is the potential for the measuring plates to fly out from the measuring units, so it is preferable to perform measurement processing in a state where the measuring plates are held using holding members such as holders.

The illustrated embodiments of the present invention have the effect that it is possible to measure more accurately the weight of an object by more accurately considering centrifugal force error and is useful as a rotary measuring device that measures the weight of an object.

The invention claimed is:

1. A rotary measuring device adapted to measure a weight of an object, the rotary measuring device comprising:
   a measuring unit including a load receiving portion configured and arranged to receive a load resulting from the object and a load detecting portion having a fixed end and a free end on which the load receiving portion is disposed;
   a rotational drive unit configured and arranged to rotate the measuring unit;
   a centrifugal force error calculating unit configured to calculate, on the basis of a first measured value outputted from the load detecting portion in a state where the measuring unit is rotating, an angular displacement value of the load detecting portion in the vicinity of the free end with respect to a horizontal plane; and
   a weight value calculating unit configured to calculate a weight value of the object on the basis of the angular displacement value and a second measured value outputted from the load detecting portion in a state where the load receiving portion is receiving the load resulting from the object.

2. The rotary measuring device of claim 1, wherein
   the centrifugal force error calculating unit includes an angular displacement function calculating section configured to calculate, on the basis of the first measured value, a function representing the angular displacement value depending on the load that the free end receives.

3. The rotary measuring device of claim 2, wherein
   the centrifugal force error calculating unit further includes an initial load calculating section configured to calculate a weight value of the load receiving portion on the basis of the first measured value.

4. The rotary measuring device of claim 3, wherein
   the centrifugal force error calculating unit further includes a turning radius calculating section configured to calculate, on the basis of the first measured value, a turning radius as a distance between the free end and a rotational center of the measuring unit.

5. The rotary measuring device of claim 4, wherein
the centrifugal force error calculating unit is configured to calculate the angular displacement value based on the first measured value including
a measured value outputted from the load detecting portion in a state where the load receiving portion is not receiving a load resulting from an object and the measuring unit is rotating at a first rotational speed,
a measured value outputted from the load detecting portion in a state where the load receiving portion is not receiving a load resulting from an object and the measuring unit is rotating at a second rotational speed,
a measured value outputted from the load detecting portion in a state where the load receiving portion is receiving a load resulting from an object having a rated maximum weight and the measuring unit is rotating at the first rotational speed, and
a measured value outputted from the load detecting portion in a state where the load receiving portion is receiving a load resulting from an object having the rated maximum weight and the measuring unit is rotating at the second rotational speed.

* * * * *